Nov. 7, 1933.  J. HANNING  1,934,060
CONDENSER MOTOR
Filed Feb. 29, 1932  3 Sheets-Sheet 1

Inventor
John Hanning

Witness:
John H. Cave

By Henry J. Miller
Attorney

Nov. 7, 1933.　　　J. HANNING　　　1,934,060
CONDENSER MOTOR
Filed Feb. 29, 1932　　　3 Sheets-Sheet 2

Inventor
John Hanning

Witness:
John H. Cave

By Henry J Muller
Attorney

Nov. 7, 1933.  J. HANNING  1,934,060
CONDENSER MOTOR
Filed Feb. 29, 1932   3 Sheets-Sheet 3

Witness: John H. Cave

Inventor
John Hanning
By Henry J. Miller
Attorney

Patented Nov. 7, 1933

1,934,060

UNITED STATES PATENT OFFICE 1,934,060

CONDENSER MOTOR

John Hanning, Elizabeth, N. J., assignor to Diehl Manufacturing Company, Elizabeth, N. J., a corporation of New Jersey Application February 29, 1932. Serial No. 595,741

3 Claims. (Cl. 172—278)

This invention relates to single-phase induction motors of the type having a main inducing winding, a condenser winding at an electrical angle to the main winding, and a tapped speed-control winding forming a continuation of the main winding. The invention has for an object to provide a motor of this type having exceptionally quiet operating characteristics at various speeds and particularly suitable for driving ventilating fans in air-conditioning systems.

According to the invention, means are provided for varying the speed of the motor under a constant applied E. M. F. and maintaining at all speeds a condition of magnetic balance in the rotor, so that the rotor has no tendency at any time to be drawn in any particular radial direction toward the stator core.

Means are also preferably provided for simultaneously varying the number of effective turns in the inducing winding and the voltage impressed upon the condenser and condenser winding which are connected in series.

The condition of magnetic balance in the rotor is preferably provided for by so arranging the sections of the speed-control winding on the stator core that the flux induced by each section produces balanced radial pulls upon the rotor.

A feature of the invention is the use of a rotor of semi-high resistance and the use of a stator having a number of poles giving a synchronous speed well in excess of the desired range of working speeds, so that the rotor will have a high slip at its rated full load speed with a low flux density in the stator and rotor cores.

The invention comprises the devices, combinations and arrangements of parts hereinafter set forth and illustrated in the accompanying drawings of certain specific embodiments of the invention from which the features of the invention and the advantages attained thereby will be readily understood by those skilled in the art.

Figure 1:
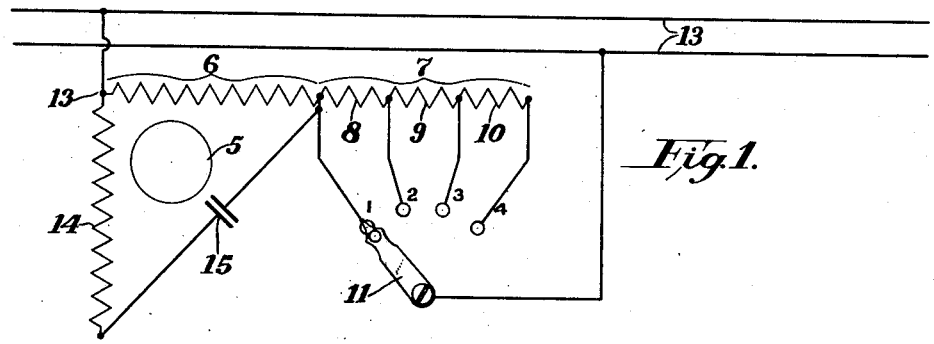
Figure 2:
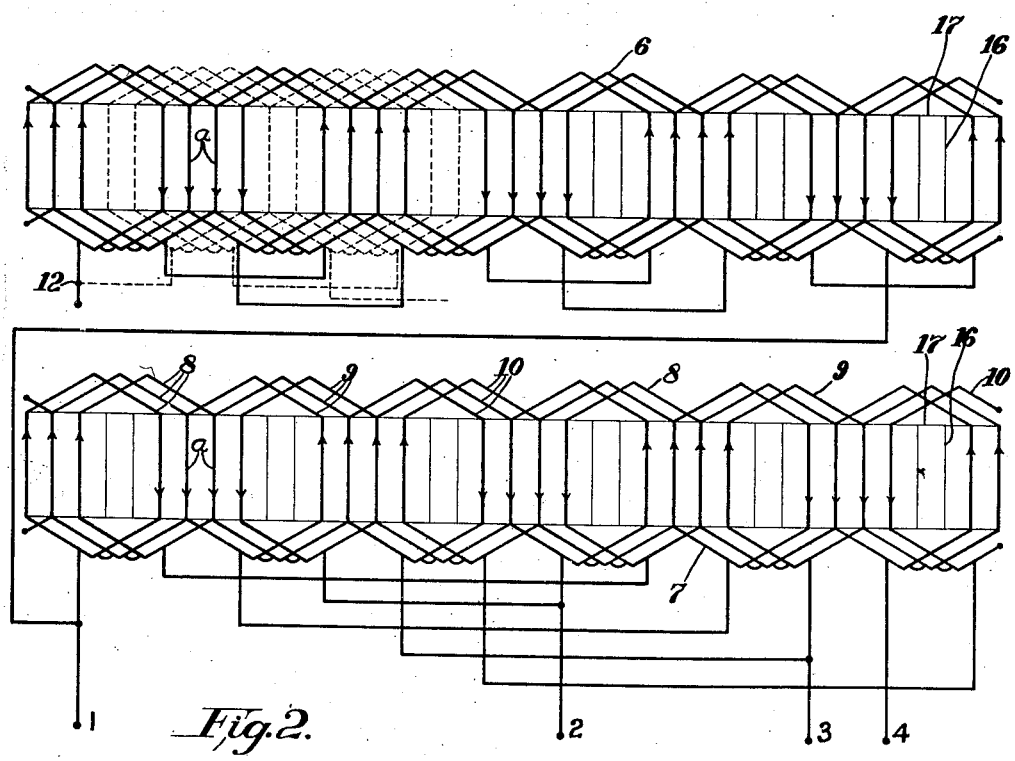
Figure 3:
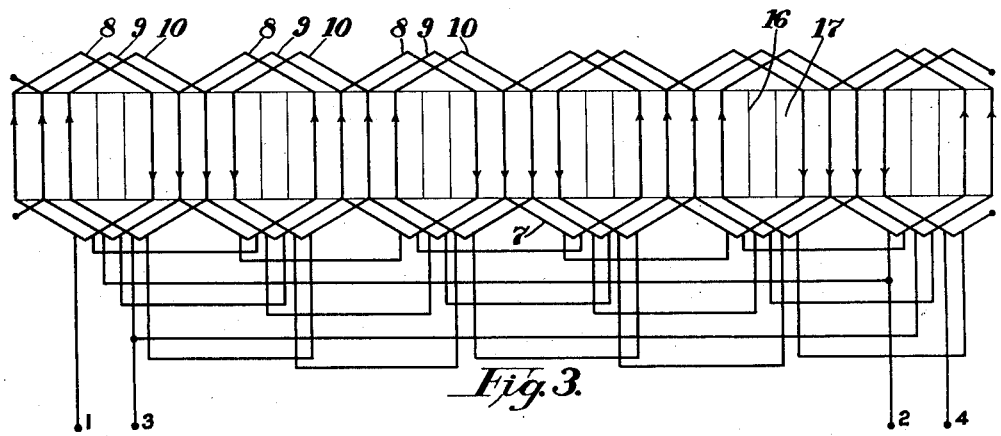
Figure 4:
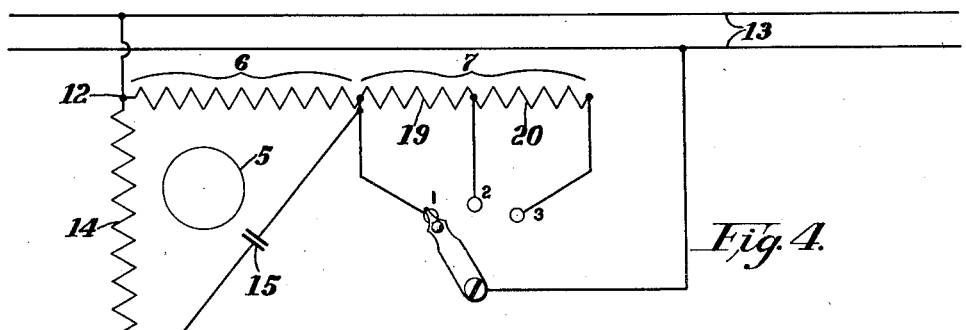
Figure 5:
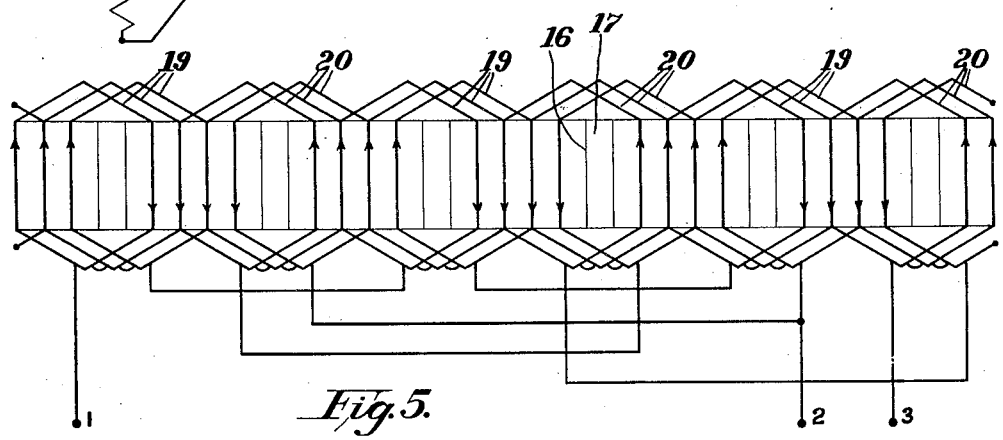
Figure 9:
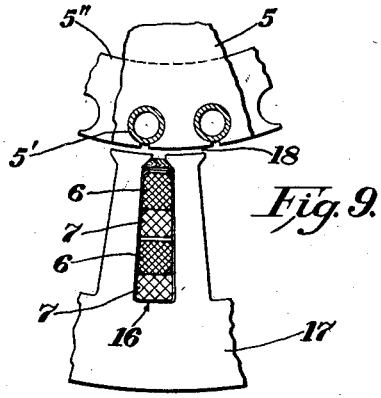
Figure 6:
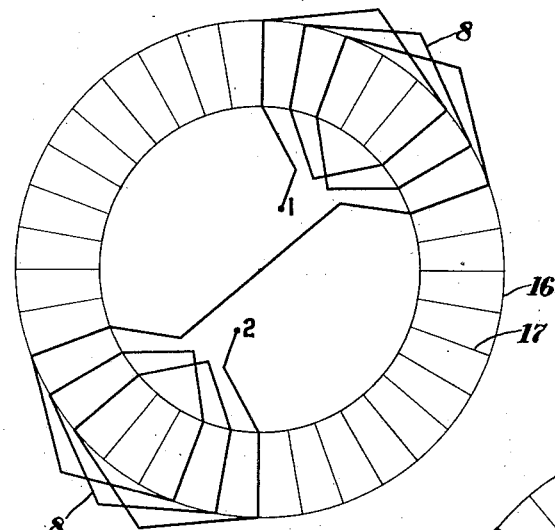
Figure 7:
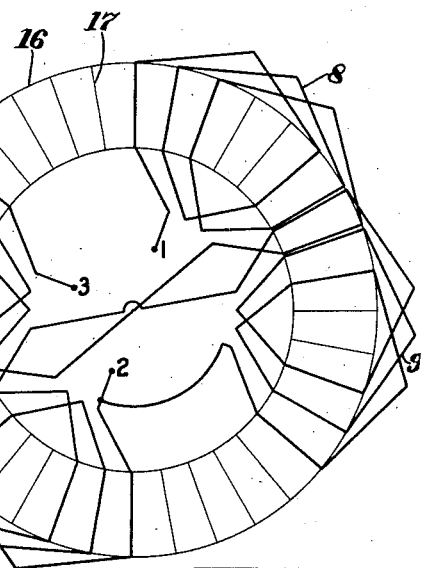
Figure 8:
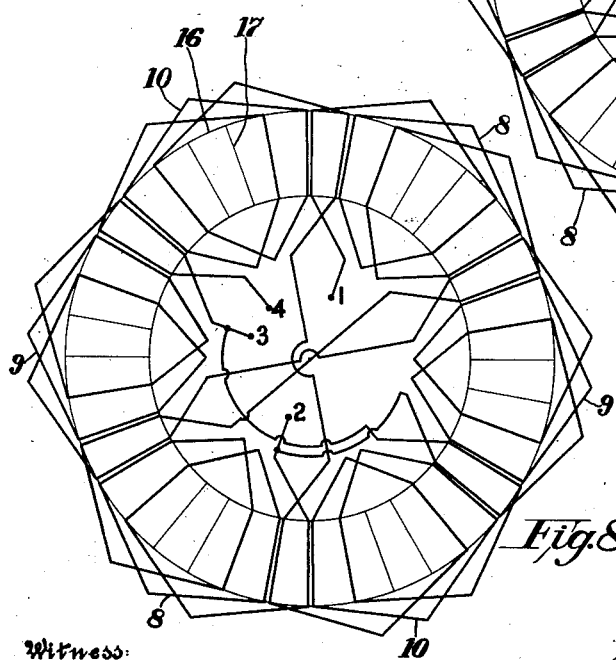

Fig. 1 is a diagrammatic representation of a motor embodying the invention. Fig. 2 is a winding diagram for the motor of Fig. 1. Fig. 3 is a diagram of a modified form of speed-control winding for the motor of Fig. 1. Fig. 4 is a diagrammatic representation of a modified form of motor. Fig. 5 is a partial winding diagram of the motor of Fig. 4. Figs. 6, 7 and 8 are diagrams showing the balancing of the live parts of the speed-control winding under different operating conditions, and Fig. 9 is a view illustrating the relative placement of the main and speed-control windings in a stator slot.

The motor comprises a rotor 5, a main winding 6, and a speed-control winding 7 including sections 8, 9 and 10, with taps 1, 2, 3 and 4, brought out to a suitable selector switch 11 which, together with the end 12 of the main winding 6, remote from the winding 7 is connected across the line 13. A condenser winding 14 is arranged at an electrical angle of preferably 90° to the main winding 6 and has a condenser 15 in series with it; the condenser circuit 14, 15 being connected across the main winding 6 exclusive of the speed-control winding 7.

The main winding 6 is received in slots 16 in an internally toothed stator core 17 and is distributed symmetrically circumferentially of such core as shown diagrammatically in full lines in the upper half of Fig. 2.

The speed-control winding 7 is received in the same slots with the main winding 6 but is preferably placed below the main winding 7 in the stator slots so as to be farther removed from the rotor 5 and air-gap 18 than the main winding 6. The windings of the sections 8, 9 and 10 of the speed-control winding 7 are each arranged upon the stator in such wise that the flux induced by each section produces balanced radial pulls upon the rotor. This has been found to contribute in large measure to quietness in operation. In the scheme of connections shown in the lower half of Fig. 2 and in Figs. 6, 7 and 8, the sections 8, 9, 10 of the speed-control winding are each divided into two groups of three coils each, placed 180° apart mechanically. In the modified scheme of connections shown in Fig. 3 the sections 8, 9 and 10 of the speed-control winding 7 are each divided into six coils spaced 60° apart mechanically.

The motor of Fig. 4 is like that of Fig. 1 except that the speed-control winding 7 is divided into two sections 19, 20 of nine coils each. The coils of each section are arranged in three groups of three coils each; the groups being spaced 120° apart mechanically around the rotor.

In any case it will be observed that each section of the speed-control winding between a pair of taps is so arranged or distributed on the stator core as to have a radially balanced inducing influence upon the rotor so that under no condition is there any unbalance of magnetic forces acting upon the rotor and tending to draw the latter in any particular direction toward the stator.

The present motor is designed to operate at speeds of from 425 to 850 R. P. M. and the stator has 36 slots with a 6 pole winding giving a synchronous speed of 1200 R. P. M. The rotor bars may be made of copper tubing 5' with rather light end rings 5" so as to have a semi-high resistance. The speed is slipped from 1200 R. P. M. to 850 R. P. M. by a suitable choice of windings to give a low flux density in the stator and rotor cores.

By locating the speed-control winding below the main winding in the stator slots, its self induction is a maximum and hence less turns are required for a given speed reduction. Also, by locating the main winding 6 as close as possible to the air-gap 18, a maximum overload capacity is gained, as well as a maximum speed at a given flux density and load.

The condenser winding 14 may have a turn ratio of the order of 1.5:1 relative to the main winding 6, and the speed-control winding 7 may have a turn ratio of 1:3 relative to the main winding. These ratios may, of course, be departed from materially, within the scope of the invention. The condenser capacity is preferably so chosen that the resultant field of the main and condenser windings is approximately circular to give maximum efficiency under running conditions, as is well understood.

Having thus set forth the nature of the invention, what I claim herein is:—

1. An induction motor having, in combination, a rotor, a slotted stator having a main winding and a speed-control winding forming a continuation of and disposed in the same slots with portions of the main winding, and a condenser winding at an electrical angle to the main winding, the portions of the speed-control winding in the stator slots being farther removed from the rotor than the corresponding portions of the main winding.

2. An induction motor having a high resistance rotor, a stator core, a main inducing winding, a condenser winding at an electrical angle to the main winding, a tapped sectional speed-control winding forming a continuation of the main winding, the sections of the speed-control winding between each pair of taps being balanced circumferentially of the stator so that the flux induced by each of said sections produces a balanced or zero resultant radial pull upon the rotor, and the main and condenser windings being so chosen as to give a low magnetic density in the rotor and stator cores with a high slip at normal running speeds.

3. An induction motor having, in combination, a rotor, a slotted stator having a main winding, a tapped sectional speed-control winding forming a continuation of and disposed in the same slots with portions of the main winding, and a condenser winding at an electrical angle to the main winding, the sections of the speed-control winding between each pair of taps being balanced circumferentially of the stator, and the portions of the speed-control winding in the stator slots being farther removed from the rotor than the corresponding portions of the main winding.

JOHN HANNING.